Feb. 7, 1950 — W. J. THACKER — 2,496,682
MACHINE FOR MAKING CINDER, CONCRETE, OR SIMILAR BLOCKS
Filed Oct. 2, 1945 — 2 Sheets-Sheet 1
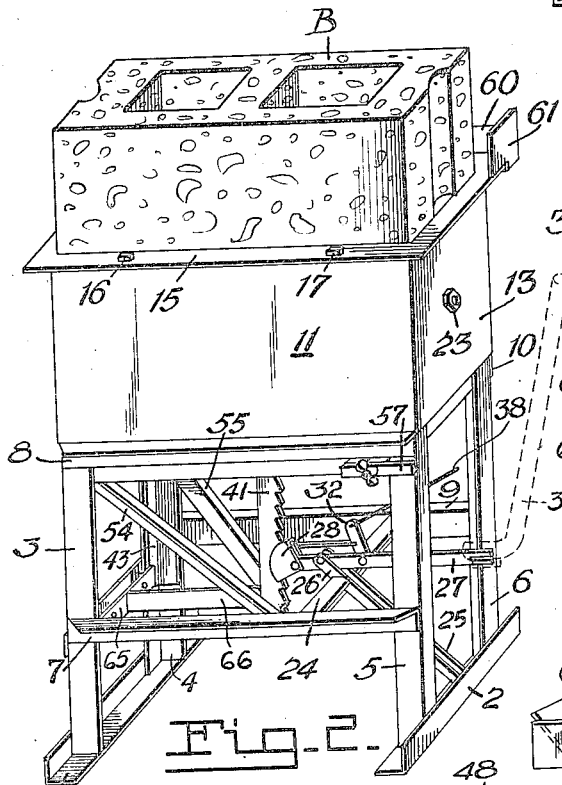
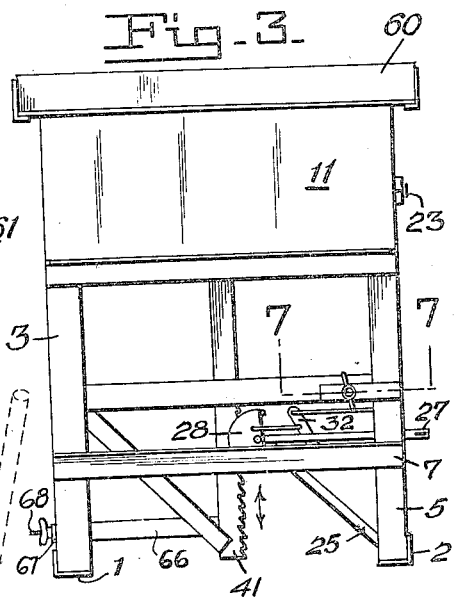
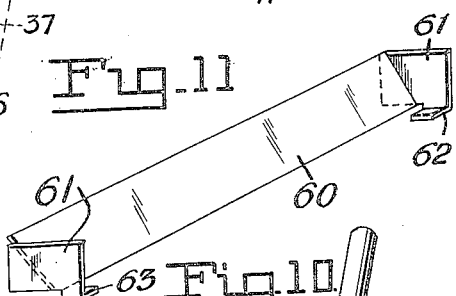
Inventor
William J. Thacker
By Elizabeth Newton Dew
Attorney Feb. 7, 1950 W. J. THACKER 2,496,682
MACHINE FOR MAKING CINDER, CONCRETE, OR SIMILAR BLOCKS
Filed Oct. 2, 1945 2 Sheets-Sheet 2
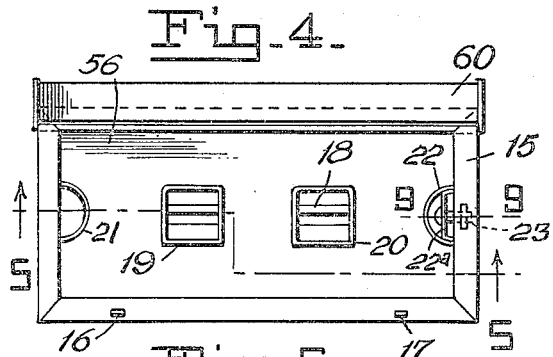
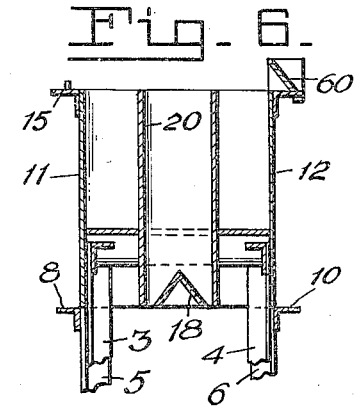
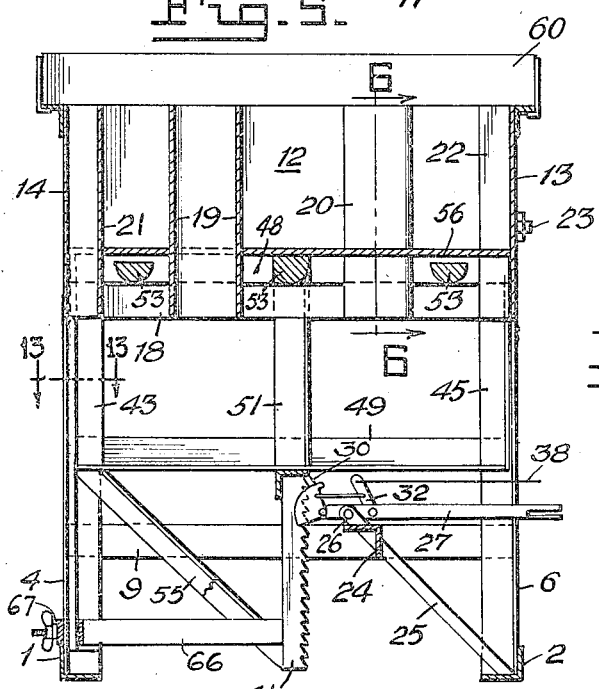
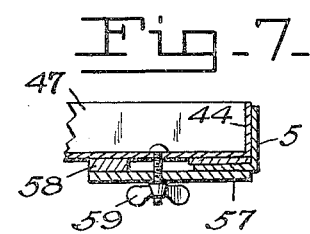
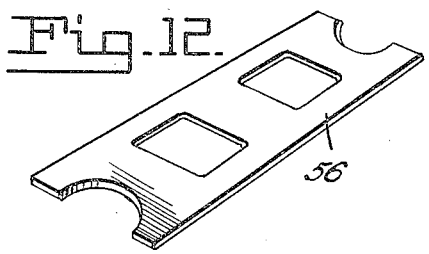
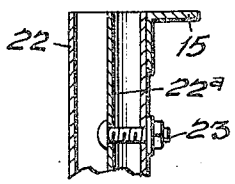
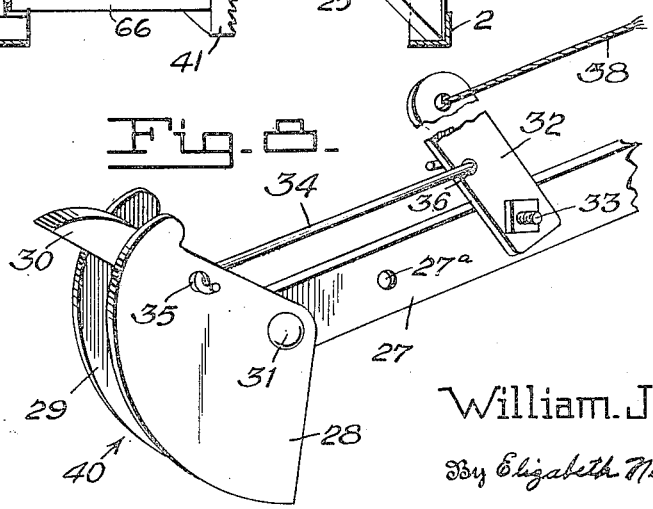
Inventor
William J. Thacker
By Elizabeth Newton Dew
Attorney Patented Feb. 7, 1950

2,496,682

UNITED STATES PATENT OFFICE 2,496,682

MACHINE FOR MAKING CINDER, CONCRETE, OR SIMILAR BLOCKS

William J. Thacker, Glen Allen, Va.

Application October 2, 1945, Serial No. 619,832

5 Claims. (Cl. 25—41)

This invention relates to machines for making cinder, concrete, or similar blocks.

It is an object of the invention to provide a machine that is rapid in operation while, at the same time, operable to produce blocks of uniform quality and superior strength.

A further object is to provide a block-making machine that is easily constructed of standard forms and shapes.

Another object is to provide a machine for making cement or cinder blocks wherein the formed blocks are positively ejected from the mold in straight-line translation whereby blocks of superior quality are produced and spoilage of blocks is reduced to a minimum.

A still further object is to provide a machine of the type mentioned, wherein the elevator or ejecting means for the blocks, is positively guided for straight-line movement relatively to and within the mold, and is positively actuated in block-ejecting movement by manually-controlled force-applying mechanism.

Another object is to provide a block-making machine wherein the mold is related in such a manner with supporting posts, as to form guide surfaces for the aforesaid elevator.

A further object is to provide a block-making machine that is rugged, long-lived, easy to operate, and relatively inexpensive and simple to construct.

Other objects and advantages of the invention will become clear as the description advances.

In the drawing:

Figure 1 is a perspective view of the invention, showing the elevator in raised position as in ejecting a block from the mold, Figure 2 is a perspective view of the elevator, per se, as it appears when removed from the machine and, in particular, showing the rigid construction, the ratchet portion of the jack, and the friction clamp for holding the elevator in any desired position of elevation, Figure 3 is a side elevation of the machine, with the elevator or block ejector in lowermost position, Figure 4 is a top plan view of the invention showing the central and end cores and the scraper or strike plate for leveling off the block material flush with the top of the mold, Figure 5 is a section taken on the line 5—5, Figure 4, and showing the elevator or ejector in lowermost position, as well as the manner in which the strike plate is guided with its scraper edge in proper position across the top of the mold, Figure 6 is a section taken upon a plane indicated by the line 6—6, Figure 5, and showing the central supporting beam for the mold cores, as well as the internal bracing of the machine, Figure 7 is a detail section as indicated by the line 7—7 of Figure 3, showing the releasable clamp for holding the elevator in any desired position of vertical adjustment, Figure 8 is a perspective view of the releasable pawl mechanism of the jack, and showing the manner in which gravity acts to hold the same in released or engaged positions, Figure 9 is a detail section as indicated by the line 9—9, Figure 4, and showing the manner in which one of the half-round end forms or cores is releasably secured in place within the mold, Figure 10 is a view of the jack handle employed with the machine, Figure 11 is a perspective view of the strike plate used to strike the material flush with the top edges of the mold, after the material has been tamped, Figure 12 is a perspective view of a pallet suitable for use with the machine and Figure 13 is a sectional view taken on the line 13—13 of Figure 5 and showing the manner in which the corner posts of the main frame and elevator cooperate to guide the latter.

In general, the machine is formed of standard steel rods, bars and plates. The several parts forming the various units are, unless otherwise noted, preferably but not necessarily, secured together by welding. However, it is within the purview of my invention to secure the parts together by bolts, rivets, or in any other suitable and well-known manner.

A pair of base bars 1 and 2 have secured thereto respective pairs of corner posts 3, 4 and 5, 6. Posts 3 and 5 are connected at the bottom by a brace bar 7, and at the top by a bar 8. Likewise, posts 4 and 6 are united by a rod 9 at the bottom and 10 at the top. A mold is formed of rectangular side plates 11 and 12, joined at their adjacent vertical edges by end plates 13 and 14. The corner posts are welded to the bottom edge of the mold in such position that the inside surfaces of the corners of the mold are flush with, and form a continuous smooth surface with the inside surfaces of the posts, here shown as comprising sections of standard angle iron. If desired, the bottom edges of side plates 11 and 12 may also be welded to bars or beams 8 and 10, to afford increased strength and rigidity. Angle irons, beveled as best shown at Fig. 4, are secured to the top edges of the mold to form a smooth continuous supporting and reinforcing ledge 15 thereabout. A pair of stops 16 and 17 are affixed to the ledge along one side wall, for a purpose to be subsequently explained.

A center beam 18, best shown at Figs. 4, 5 and 6, extends parallel to the bottom edges of side plates 11 and 12 and may be secured to the mold as by welding to the end plates 13 and 14 at their central lower portions. This beam may conveniently be a section of angle iron positioned as shown at Fig. 6, to support a pair of spaced parallel cores 19 and 20. In the machine illustrated these cores are hollow and generally square in cross section. Each core is notched at its base to fit over beam 18 and is welded thereto to form a rigid unitary structure.

As best shown in Fig. 4, an end form or core 21 is secured in vertical position centrally of end plate 14 and, in the species of the invention selected for illustration, may be a half-section of pipe. A like end core 22 is secured in corresponding position to end plate 13 by a bolt 23, Fig. 9, so that it may be removed when corner or end blocks are being made. As seen in Fig. 4, form 22 may have an internal strut 22a welded thereto and through which bolt 23 passes. Thus the mold, with all forms or cores in place is adapted to form blocks of the general shape and contour shown at B, Fig. 1.

A bar 24 extends transversely between and has its ends welded to bars 7 and 9. A brace rod 25 has one end secured centrally of base bar 2 and its other end attached to supporting bar 24. This rod is for the purpose of taking the main portion of the downward thrust exerted by the jack member in ejecting blocks from the mold, in the manner subsequently described. The top central portion of bar 24 has secured thereto a pair of spaced upstanding lugs 26 adapted to pivotally support between them a jack lever 27 by means of a pivot pin passing through aligned holes in lugs and lever.

From Fig. 8 it will be noted that lever 27 has a pair of spaced sectors 28 and 29 pivoted thereon at its inner end by means of a pivot 31. These sectors are united to a pawl 30 interposed between them. The three parts 28, 29 and 30 are welded together to form a rigid unitary pawl element indicated generally by the numeral 40. At the other side of the fulcrum point of lever 27, as defined by aperture 27a, lever 27 has a handle 32 connected thereto by means of a pivot 33. A link rod 34 has its ends bent to pass through corresponding apertures 35 and 36 in sector 28 and handle 32 so that, when handle 32 is pulled back, it acts through rod 34 to pivot the aforesaid pawl element to release the pawl 30 from the ratchet rod 41.

The outer end of lever 27 is split, as shown, to receive the end of an operating handle 37, shown at Fig. 10. This handle has a pair of lugs 38 welded to its lower side at one end and which are spaced to receive the lower section of the split end of lever 27 when the open end of the handle is slipped over the upper section. In this manner the handle is held against turning on lever 27, is always maintained in position for convenient operation and may be quickly removed when desired. A pull cable 38 may be connected to the free end of handle 32 and may extend to a latch or eye on the handle so that the pawl element may be rapidly and conveniently released in the operation of the machine.

An elevator cage, indicated generally by the numeral 39 is provided. This cage, in the model selected for illustration, consists of four corner bars 42, 43, 44 and 45. These bars are connected at top and bottom by respective pairs of longitudinal brace bars 46, 47 and 48, 49, to form side frames. Each side frame includes respective central vertical reinforcing bars 50 and 51. The two side frames thus formed are connected at the bottom by a spacer bar 52 and at the top by spacer rods 53. As shown at Fig. 5, these rods may be half-round sections welded to brace bars 46 and 48 with their flat sides upward and flush with the upper surfaces of said bars. If preferred, rods 53 may comprise angle irons positioned to form an inverted V so that excess material will not lodge on them. Ratchet rod 41, previously mentioned, is affixed at one end to the central portion of spacer bar 52 and is formed with serrations or teeth upon the side or edge adjacent ratchet element 40. A first brace bar 54 is secured at one end to the lower extremity of rod 41 and at its other end to the lower corner of the cage formed by the bars 42 and 47. Likewise, a second brace bar 55 similarly connects rod 41 and the lower corner of the cage formed by bars 43 and 49. It will be noted from Fig. 2, that the corner bars 42 and 43 are longer than 44 and 45. These bars are of a length to be substantially co-extensive with the bottom of ratchet rod 41. A lower bar 65, Fig. 2, extends across and is welded at its ends, to the lower inside extremities of bars 42 and 43. A reach bar 66 extends between the central portion of bar 65 and rod 41 and acts to take the horizontal component of thrust of the pawl element 40 on ratchet rod 41 during ejection of the block. Because of the length of bars 42 and 43, the resultant of this thrust appears as a pressure only between the bars 42, 43 on the one hand, and posts 3 and 4 on the other hand. Thus there is no tendency for the cage to pivot or rotate relatively to the supporting frame of the machine during the ejection of blocks. Binding is thereby eliminated and smooth operation of the cage is assured.

As shown at Figs. 1 to 3, and 5, a clamp bar 67 is adapted to extend between and across the adjacent outer surfaces of posts 3 and 4. A pair of spaced bolts 68 (Fig. 3) pass through aligned holes in bars 65 and 67 and are welded to bar 65. When wing nuts on said bolts are properly adjusted, the friction of the ends of bar 67 on posts 3 and 4, acts to hold the cage in any position to which the latter is moved by the jack. In addition, bars 65 and 67 are useful as means to apply force by stepping on them should the cage stick or bind, for any reason. This clamping means may be in addition to clamp 57. It should also be noted that pawl element 40 may be automatically tilted from inactive to active position in engagement with rod 41, merely by raising handle 37 to its full height. The parts of the cage proper are preferably, but not necessarily, welded together to form a rigid, unitary structure. The flush upper surfaces of bars 46, 48 and rods 53, form a flat supporting surface for a pallet 56, shown at Fig. 12. However, in a modification, it is contemplated that the central rod 53 may be raised slightly, say one-eighth of an inch, above the level of the end rods 53. This feature permits the pallet to tilt slightly during the ejection of a block and aids in smoothing the sides of and preventing breakage of the block. The feature also aids in placing tongs under the pallet in the removal of the pallet and block resting thereon. The pallet is so shaped and cut away as to have a smooth sliding fit within the mold and over the cores 19, 20, 21 and 22. Plywood, three-quarters of an inch in thickness is preferred for making these pallets.

As shown upon Fig. 7, a clamp plate 57 is supported at one end on brace bar 47, by a block 58. The other end of said plate extends over the adjacent side of post 5 so that, when wing nut 59 is turned down, the aforesaid side of post 5 is clamped between plate 57 and bar 47, to thereby aid in securing the cage in any position of vertical adjustment. The friction thus introduced, in addition to that added by clamp bar 67 acts to hold the cage in the upward positions to which it is moved by pawl element 40 when handle 37 is raised to engage the next tooth on ratchet rod 41.

The dimensions of the cage are such that it has a smooth sliding fit within the guide surfaces formed by the inner surfaces of the four corner posts 3, 4, 5 and 6, and the inner corner surfaces of the mold. As a result, the cage is positively guided for smooth and accurate movement within the framework of the machine. As a result of this construction, smooth accurate blocks of superior form, texture and strength, are produced. See Fig. 13.

From Fig. 11 it will be noted that the scraper or strike-off member consists of a plate 60 with a straight lower edge. Guide sections 61 and 62 are welded to the ends of plate 60. Each section is formed with a lug, such as 63 adapted, when the scraper is in place, to project under top ledge 15. This construction prevents removal of the scraper by a direct lift, guides the same in its movement across the top of the mold, and at the same time permits limited pivotal movement of plate 60 in the plane of the top surface of ledge 15. The stops 16 and 17 are positioned to engage this plate and to prevent it from being inadvertently moved off the adjacent side of the mold.

The operation of my machine will now be clear. With a pallet 56 resting on upper surfaces 46, 48 and 53, and the cage in lowermost position, rods 53 rest upon center beam 18. The mold is now filled with the cementitious moistened material of which the blocks are to be made and the material is tamped and packed to eliminate air pockets and to make certain that the material is properly compacted. Scraper 60 is then moved across the mold with its bottom edge in engagement with the top surface of ledge 15. By a combined translation and oscillation, hollow spots are filled, high spots are leveled, and any excess material is removed. In this manner a smooth planar top surface of the block is assured. Attention is invited to the fact that the inclined plate 60 tends to compact the material downwardly into the mold and thus tends to produce a smooth dense top surface.

The scraper is next returned to its original position at the side of the mold opposite stops 16 and 17, and handle 37 is worked up and down to actuate the jack and raise the cage step by step in an obvious manner, to thereby expel the block from the machine. The force thus applied acts to compact the block further and, as the block rises out of the mold, the smooth sides of the latter act to produce a block of superior smoothness and texture. The cage is raised until the pallet has its lower surface a little above the top of the mold whereupon the block is lifted off by means of tongs placed under the ends of the pallet, and the block and pallet are conveyed to the drying location. After the block has sufficiently hardened or set, the pallet is removed and used for making subsequent blocks. Thus a few dozen pallets will suffice to keep the machine in continuous production.

Handle 32 is next pulled back to rotate pawl 30 out of engagement with ratchet rod 41. By operating or stepping upon bars 65 and 67 the cage is forced to its lowermost position. It should be noted that when pawl element 40 is positioned about pivot 31 so that pawl 30 engages the teeth of rod 41, the unbalanced weight of the pawl element, combined with that of lever 32, acts to urge the pawl into contact with rod 41. On the other hand, when element 40 is swung so that pawl 30 is out of engagement with rod 41, the unbalanced weight acts to hold the pawl in that position.

Blocks of any desired height may be formed by my machine. When the rods 53 are resting upon beam 18, the dimensions of the machine are such that the top surface of a ¾" pallet resting upon rods 53, will have its top surface exactly 8" below the level of the top of the mold. The spacing of teeth upon ratchet rod 41 is 1" and the jack is so related with the ratchet rod that one stroke of handle 37 will raise the pallet within the mold exactly one inch. Now, should a 6" block be desired, it is merely necessary to lower the cage to its lowest position, as for an 8" block, then operate the handle twice to thereby raise the pallet 2". As a result, pallet 56 will then be exactly 6" below the top of the mold and the machine is in a position to make a block 6" in thickness. Furthermore, the last inch of movement clears the bottom of the pallet from the top of the mold by ¼" so that the lifting tongs may be easily inserted under the pallet. In this manner, blocks of any heights within the capacity of the machine, may be formed.

The machine also has numerous other uses. For example, to make so-called "4" in 1 bricks or blocks, a plate of 16-gauge steel of a width equal to the distance between cores 19 and 20, and a length equal to the width of the mold, is provided. This plate has half-round forms welded to its ends so that, when in position between the cores 19 and 20, the forms are vertical, in contact with and centrally of the respective sides of the mold. The resulting block therefore, has a central vertical depression causing it to resemble two smaller blocks.

Thus I have provided a machine that is sturdy, powerful, positive and rapid in operation while, at the same time producing blocks of superior smoothness and uniformity of strength. The operation of the machine itself acts to keep the mold clean. Clogging is thus impossible. If desired, a hopper or chute for material may be attached at the side of the machine adjacent stops 16 and 17 on a special support built for that purpose. The strike plate may then serve as one side of the hopper, and acts to carry surplus material back to the hopper and, at the same time, to smooth the top surface of the block.

As a possible modification, it is contemplated substituting sections of angle iron for half-round rods 53, placing each as an inverted "V" so that any material falling thereon will be deflected onto the ground. Brace bars 46 and 48 may also be positioned as inverted "V's" for a like purpose. A clean supporting surface for the pallet will thereby be assured.

While I have shown and described a preferred form of the invention, numerous changes, modifications and substitutions will occur to those skilled in the art. Therefore I wish it understood that I reserve all such modifications, alterations, and substitutions of equivalents as fall within the scope of the sub-joined claims. The foregoing disclosure is therefore to be taken in an illustrative, rather than a limiting sense.

Having thus fully disclosed my invention, what I claim and desire to secure by Letters Patent is:

1. In a machine for making blocks of cementitious material, rectangular side and end plates united at their vertical meeting edges to form a rectangular mold, a support for said mold including four angle sections, each section being rigidly united with a respective corner of said mold so that the inner surfaces of said sections are coplanar with the adjacent inner surfaces of said plates, an elevator cage including four corner bars, spacer bars and brace bars uniting said corner bars in parallel relation whereby the outer surfaces of each said corner bar slidably fits the corresponding inner surfaces of said angle sections and plates, to thereby guide said cage within said frame and mold for vertical translation only, a ratchet rod rigidly attached to said cage and depending vertically therefrom, a lever pivoted on said frame, a pawl element pivotally mounted on the end of said lever adjacent said ratchet and adapted, when said lever is oscillated on its pivot, to move said rod and cage vertically to eject a block from said mold, adjustable friction means for clamping said cage to one of said angle sections to thereby maintain said cage in vertically raised position, and manually operable means effective to pivot and maintain said pawl element out of contact with said ratchet rod.

2. In a machine for forming blocks of cementitious material, a generally rectangular mold having open top and bottom, an elevator adapted to support and translate a pallet from a first position adjacent the lower edge of said mold, to a second position adjacent the top thereof, said elevator including at least three spaced, substantially horizontal bars, adapted to support and elevate said pallet between said positions, the central one of said bars being elevated slightly above the plane determined by the remaining bars, whereby a pallet supported on said bars may tilt slightly during a block-ejecting movement.

3. In a machine for making cinder, concrete, and similar blocks, a frame including four corner posts right angular in cross section, a mold rectangular in cross section supported on said posts and having an open top and bottom, the inside surfaces of said posts being coplanar with the inside surfaces of corresponding inner wall surfaces of said mold, an elevator having a sliding fit within said posts and mold and guided for translation by and along said posts and mold in a path parallel to said posts, said elevator including substantially horizontal spaced cross members adapted to support a pallet, jack means carried by said frame and elevator, said means being operable to exert a direct upward thrust on said elevator parallel with said path to thereby translate said elevator and pallet within said mold from a position in which said cross members and pallet are adjacent the bottom of said mold, to a position in which said members and pallet are substantially flush with the top of said mold, said cross members being at least three in number and substantially parallel, an intermediate one of said members having its pallet-engaging surface positioned slightly above the plane determined by the remaining cross members, whereby said pallet may tilt slightly during block-ejecting movement.

4. In a block-making machine, a mold having side and end walls open at top and bottom, an elevator movable within said mold to eject a block therefrom, said elevator having an upper, pallet-supporting surface comprising three spaced parallel bars, the middle one of said bars having its upper surface a little above the plane determined by the corresponding surfaces of the two end bars, whereby to effect slight tilting movement of said pallet during an upward block-ejecting movement of said elevator.

5. In a machine for making blocks of cementitious material, side and end walls united at their meeting vertical edges to form rectangular mold having open top and bottom, angle irons secured to the corners of said mold, respectively, with their inner surfaces coplanar with the respective inner surface of said mold, a rectangular elevator frame comprising four parallel corner guide bars united to form a cage, said cage fitting within and guided for vertical translation only by said inner surfaces of said angle irons and mold, said elevator including three spaced substantially parallel bars extending transversely of said mold, said bars having upper edges adapted to support a pallet, the upper edge of the middle one of said bars being spaced slightly above the plane of the edges of the two end bars.

WILLIAM J. THACKER.

REFERENCES CITED

The following references are of record in the file of this patent:

UNITED STATES PATENTS

| Number | Name | Date |
|---|---|---|
| 796,939 | Schwerdtfeger | Aug. 8, 1905 |
| 800,500 | Shell | Sept. 26, 1905 |
| 825,918 | Melton | July 17, 1906 |
| 1,062,040 | Sellman | May 20, 1913 |
| 1,531,479 | Erickson | Mar. 31, 1925 |
| 1,634,740 | Dale | July 5, 1927 |
| 2,240,776 | Henderson | May 6, 1941 |
| 2,270,829 | Wellnitz | Jan. 20, 1942 |
| 2,389,673 | Lofdahl | Nov. 27, 1945 |